US011422829B1

(12) United States Patent
Fisher et al.

(10) Patent No.: US 11,422,829 B1
(45) Date of Patent: Aug. 23, 2022

(54) SYSTEMS AND METHODS FOR RESILIENT SERVICE WORKER BRIDGE

(71) Applicant: Morgan Stanley Services Group Inc., New York, NY (US)

(72) Inventors: Max Aaron Fisher, South Orange, NJ (US); Paul Christopher Goldsmith, Great Neck, NY (US); Russell Norman Nelson, Webster, MA (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 17/528,396

(22) Filed: Nov. 17, 2021

(51) Int. Cl.
*G06F 9/4401* (2018.01)
*G06F 9/50* (2006.01)
*G06F 9/30* (2018.01)

(52) U.S. Cl.
CPC ........ *G06F 9/4411* (2013.01); *G06F 9/30174* (2013.01); *G06F 9/5016* (2013.01)

(58) Field of Classification Search
None
See application file for complete search history.

(56) References Cited

U.S. PATENT DOCUMENTS

| 10,908,949 | B2 | 2/2021 | Jeong et al. |
| 2015/0331726 | A1 | 11/2015 | Aguera y Arcas et al. |
| 2017/0317773 | A1 | 11/2017 | Yamagishi et al. |
| 2019/0007373 | A1 | 1/2019 | Slobodskyy |
| 2019/0095196 | A1 | 3/2019 | Anderson |
| 2019/0104194 | A1* | 4/2019 | Imm ........................ H04L 67/28 |
| 2019/0384636 | A1 | 12/2019 | Jeong et al. |
| 2019/0391849 | A1 | 12/2019 | Jeong et al. |
| 2020/0042332 | A1* | 2/2020 | Trocki ................ G06F 9/44526 |
| 2020/0106860 | A1 | 4/2020 | Sullivan et al. |
| 2020/0252474 | A1 | 8/2020 | Nanavati et al. |
| 2020/0252476 | A1 | 8/2020 | Nanavati et al. |
| 2020/0310863 | A1 | 10/2020 | Wong |
| 2021/0012021 | A1 | 1/2021 | Pickhardt |
| 2021/0067600 | A1 | 3/2021 | Gupta et al. |
| 2021/0096844 | A1 | 4/2021 | Christian et al. |
| 2021/0377332 | A1* | 12/2021 | Ray ......................... H04L 67/02 |
| 2022/0043881 | A1* | 2/2022 | Putnam .................... G06F 8/71 |
| 2022/0050699 | A1* | 2/2022 | Momchilov ............ G06F 21/41 |

* cited by examiner

*Primary Examiner* — Qing Chen
(74) *Attorney, Agent, or Firm* — Pearl Cohen Zedek Latzer Baratz LLP

(57) ABSTRACT

A method and system for an application to load one or more files from a device (e.g., local disc of the device) rather than from a location outside of the device (e.g., a server) via a service worker. The service worker can communicate with one or more main JavaScript threads (e.g., clients) via one or more corresponding service worker bridges that communicates with one or more corresponding main JavaScript thread bridges that communication with the main JavaScript threads. The main JavaScript threads can communicate with the local disc of the device (e.g., native) to retrieve the one or more files and transmit them to the service worker such that the service worker can provide the one or more files to the application. In this manner, service workers can provide service with data stored in a memory of a computer device of a computer.

16 Claims, 6 Drawing Sheets

SYSTEMS AND METHODS FOR RESILIENT SERVICE WORKER BRIDGE

FIELD OF THE INVENTION

The invention relates generally systems and method for use with networked computing devices. In particular, to systems and method for networked computing devices having applications that use service workers.

BACKGROUND

Many current networked computing systems and devices include web-based content that users and applications access. Web-based content can be accessed via web browsers and via the internet. For some applications, e.g., mobile applications, it can be desirable to provide a cache to allow websites to work offline, as well as boost load times. For example, a custom proxy server can serve assets (e.g., files) from a local cache on a mobile device.

Service workers (e.g., scripts) can be employed by web browsers separately from a web page being accessed, and thus its cache can be spared when the operating system deletes contents of a local cache. Service workers can run in the background to perform specific tasks, e.g., cache web pages, push notifications and/or background synchronizations, and can follow known protocols for service worker communication. One difficulty with this approach is that during operation, the cache can be automatically deleted by the operating system thus deleting the stored assets. One solution to this problem is to use a cache that is not controlled by the browser. However, the service worker lacks an interface to the native bridge and thus typically cannot access the assets necessary to allow websites to work offline and/or boost load times.

SUMMARY OF THE INVENTION

One advantage of the invention can include the ability for service worker to coordinate work with a main JavaScript thread. One advantage of the invention can include using exclusive main thread API's from the service worker.

In one aspect, the invention involves a method for a service worker to provide service with data stored in a memory of a computer device of a user. The method also involves triggering an event by the service worker for data from a main JavaScript thread, the data stored in the memory of the computing device of the user. The method also involves transmitting the request by a service worker bridge to a main JavaScript thread bridge for the data. The method also involves transmitting the request from the main JavaScript thread bridge to the main JavaScript thread for the data. The method also involves loading by the main JavaScript thread the data from the memory of the computing device of the user. The method also involves transmitting by the main JavaScript thread the data to the main JavaScript thread bridge. The method also involves transmitting by the main JavaScript thread bridge the data to the service worker bridge. The method also involves transmitting by the service worker bridge, the data, to the service worker.

In some embodiments, the computing device is a mobile device. In some embodiments, the data is a web page. In some embodiments, the main JavaScript thread is part of a mobile application.

In some embodiments, the method involves triggering a second event by the service worker for a second data from a second main JavaScript thread, the second data store in the memory of the computing device of the user. The method also involves disconnecting the service worker bridge from the main JavaScript thread bridge. The method also involves transmitting the second request by the service worker bridge to the second main JavaScript thread bridge for the second data. The method also involves transmitting the request from the second main JavaScript thread bridge to the second main JavaScript thread for the second data. The method also involves loading by the second main JavaScript thread the second data from the memory of the computing device of the user. The method also involves transmitting by the second main JavaScript thread the second data to the second main JavaScript thread bridge. The method also involves transmitting by the second main JavaScript thread bridge the second data to the service worker bridge. The method also involves transmitting by the service worker bridge, the second data, to the service worker.

In some embodiments, the method involves determining by the service worker that the second main JavaScript thread has disconnected. The method also involves transmitting a third request by a service worker bridge to the main JavaScript thread bridge for the data. The method also involves transmitting a forth request by a service worker bridge to the main JavaScript thread bridge for and the second data. The method also involves transmitting loading by the main JavaScript thread the first data and the second data from the memory of the computing device of the user. The method also involves transmitting by the main JavaScript thread the data to the main JavaScript thread bridge. The method also involves transmitting by the main JavaScript thread the second data to the main JavaScript thread bridge. The method also involves transmitting by the main JavaScript thread bridge the data to the service worker bridge. The method also involves transmitting by the main JavaScript thread bridge the second data to the service worker bridge. The method also involves transmitting by the service worker bridge, the data, to the service worker based on an active state of the main JavaScript thread. The method also involves transmitting by the service worker bridge, the second data, to the service worker based on an active state of the second main JavaScript thread.

In some embodiments, determining by the service worker that the second main JavaScript thread has disconnect further comprises periodically testing by the service worker bridge whether the second main JavaScript thread is connected.

In some embodiments, wherein each new request for a data is given priority by the service worker over a prior request.

In one aspect, a non-transitory computer program product comprising instructions which, when the program is executed cause the program to trigger an event by a service worker for data from a main JavaScript thread, the data stored in the memory of a computing device of a user. The program is also caused to transmit the request by a service worker bridge to a main JavaScript thread bridge for the data The program is also caused to transmit the request from the main JavaScript thread bridge to the main JavaScript thread for the data. The program is also caused to load by the main JavaScript thread the data from the memory of the computing device of the user. The program is also caused to transmit by the main JavaScript thread the data to the main JavaScript thread bridge. The program is also caused to transmit by the main JavaScript thread bridge the data to the service worker bridge. The program is also caused to transmit by the service worker bridge, the data, to the service worker.

In some embodiments, the computing device is a mobile device. In some embodiments, the data is a web page. In some embodiments, the main JavaScript thread is part of a mobile application.

In some embodiments, the instructions further cause the computer to trigger a second event by the service worker for a second data from a second main JavaScript thread, the second data store in the memory of the computing device of the user, disconnect the service worker bridge from the main JavaScript thread bridge, transmit the second request by the service worker bridge to the second main JavaScript thread bridge for the second data, transmit the request from the second main JavaScript thread bridge to the second main JavaScript thread for the second data, load by the second main JavaScript thread the second data from the memory of the computing device of the user, transmit by the second main JavaScript thread the second data to the second main JavaScript thread bridge, transmit by the second main JavaScript thread bridge the second data to the service worker bridge, and transmit by the service worker bridge, the second data, to the service worker.

In some embodiments, the instructions further cause the computer to determine by the service worker that the second main JavaScript thread has disconnected, transmit a third request by a service worker bridge to the main JavaScript thread bridge for the data, transmit a fourth request by a service worker bridge to the main JavaScript thread bridge for and the second data, load by the main JavaScript thread the first data and the second data from the memory of the computing device of the user, transmit by the main JavaScript thread the data to the main JavaScript thread bridge, transmit by the main JavaScript thread the second data to the main JavaScript thread bridge, transmit by the main JavaScript thread bridge the data to the service worker bridge, transmit by the main JavaScript thread bridge the second data to the service worker bridge, transmit by the service worker bridge, the data, to the service worker based on an active state of the main JavaScript thread, and transmit by the service worker bridge, the second data, to the service worker based on an active state of the second main JavaScript thread.

In some embodiments, the instructions further cause the computer to determine by the service worker that the second main JavaScript thread has disconnect further comprises periodically testing by the service worker bridge whether the second main JavaScript thread is connected. In some embodiments, the instructions further cause the computer to non-transitory computer program product of claim 9 wherein each new request for a data is given priority by the service worker over a prior request.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

In general, an application (e.g., a mobile application) can launch a connect to one or more servers and download one or more service workers and register a device that the application is running on. The application can require that one or more files (e.g., data) be loaded from the device (e.g., local disc of the device) rather than from a location outside of the device (e.g., a server).

The service worker can communicate with one or more main JavaScript threads (e.g., clients) via one or more corresponding service worker bridges that communicates with one or more corresponding main JavaScript thread bridges that communication with the main JavaScript threads. The main JavaScript threads can communicate with the local disc of the device (e.g., native) to retrieve the one or more files and transmit them to the service worker such that the service worker can provide the one or more files to the application. In this manner, service workers can provide service with data stored in a memory of a computer device of a computer.

Figure 1:
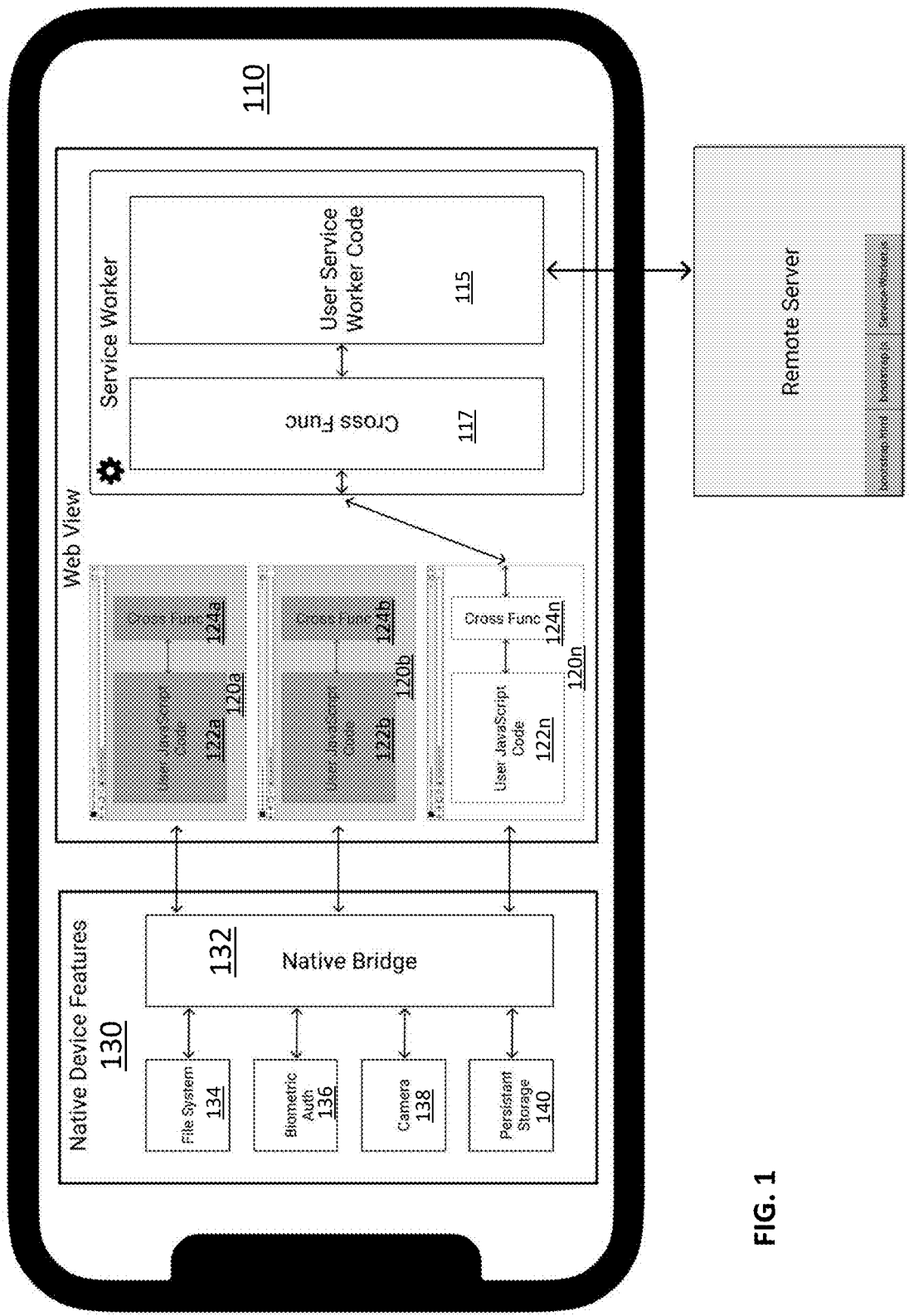
FIG. 1 is a block diagram of a system architecture a service worker to provide service with data stored in a memory of a mobile device, according to some embodiments of the invention.

FIG. 1 is a block diagram of a system architecture a service worker to provide service with data stored in a memory of a mobile device 110, according to some embodiments of the invention. The mobile device 110 can have a system architecture that can include a service worker 115, a service worker bridge 117, a plurality of webpages 120*a*, 120*b*, . . . 120*n*, generally clients 120, and a native device architecture 130. The mobile device 110 can be in communication with a remote server 150 to, for example, retrieve the service worker 115 including the service worker bridge 117.

Each of the plurality of webpages 120 can include a main JavaScript thread and a main JavaScript thread bridge. In particular, webpages 120*a* can include main JavaScript thread 122*a* and a main JavaScript thread bridge 124*a*, webpage 120*b* can include main JavaScript thread 122*b* and a main JavaScript thread bridge 124*b*, . . . webpage 120*n* can include main JavaScript thread 122*n* and a main JavaScript thread bridge 124*n*, generally main JavaScript thread 122, and main JavaScript thread bridge 124. The number of clients in the plurality of webpages 120 can depend on a particular webpage's code. In some embodiments, if the clients are iframes, and the iframes are on the same domain and port, they can communicate to the service worker 115 using the service worker bridge 117.

Each webpage 120 can have a respective main JavaScript thread and can have a main JavaScript thread bridge. Each main JavaScript thread and/or service worker thread can include a library that is stateless and reacts to requests from the service worker bridge. In some embodiments, each function request has a generated id. The generated id along with the function arguments can be stored in a hash table on the service worker. In the event of a client disconnect/switch, the service worker can take all of the entries in the hash table and re-call the functions on the new client. This process can be scheduled to avoid data races. A queue can be used to allow one function call to be transmitted at a time (e.g., sending the function may not require waiting for completion). In this manner, the main JavaScript bridge can be stateless.

The native device architecture 130 can include a native bridge 132, file system 134, biometric authorization module 136, camera 138, persistent storage 140. In some embodiments, the native device architecture 130 includes other elements as are known in the art.

In various embodiments, the user's device is not a mobile device, and can be other user devices (e.g., a person computing device, a smart watch, a tablet, or smart TV). The native device architecture 130 can be dependent upon the device type (e.g., mobile device, personal computing device, smart watch, tablet), the manufacturer of the device, or any combination thereof. The native device architecture 130 can be any native device architecture 130 as is known in the art.

During operation, an application (not shown) can be launched on the mobile device 110. The service worker 115, the service worker bridge 117, the main JavaScript thread 122*a* and the main JavaScript thread bridge 124*a* are initiated. The service worker 115 can retrieve an asset (e.g., an HTML page) to be used by the application by communicating with the main JavaScript thread 122*a* via the service worker bridge 117 and the main JavaScript thread bridge 124*a*. The main JavaScript thread 122*a* can communicate with the native device architecture 130 to retrieve the asset. In this manner, an application can be stored on a user device with assets to be used by the application (e.g., files, web pages, etc. bundled with the application), instead of storing the assets at a location away from the user device (e.g., a server), and the local assets can be retrieved via the service worker to, for example, reduce an amount of time it takes to load assets into an application during application use.

As the operation of the application continues, and various functionality of the application is called upon, the main JavaScript threads 122*b* . . . 122*n*, can be initiated and communicated with via the service worker bridge 117 and their respective main JavaScript thread bridges 124*b* . . . 124*n*.

The service worker 115, the service worker bridge 117, the main JavaScript 122, the main JavaScript thread 124 can communicate according to the PostMessage API.

Figure 2:
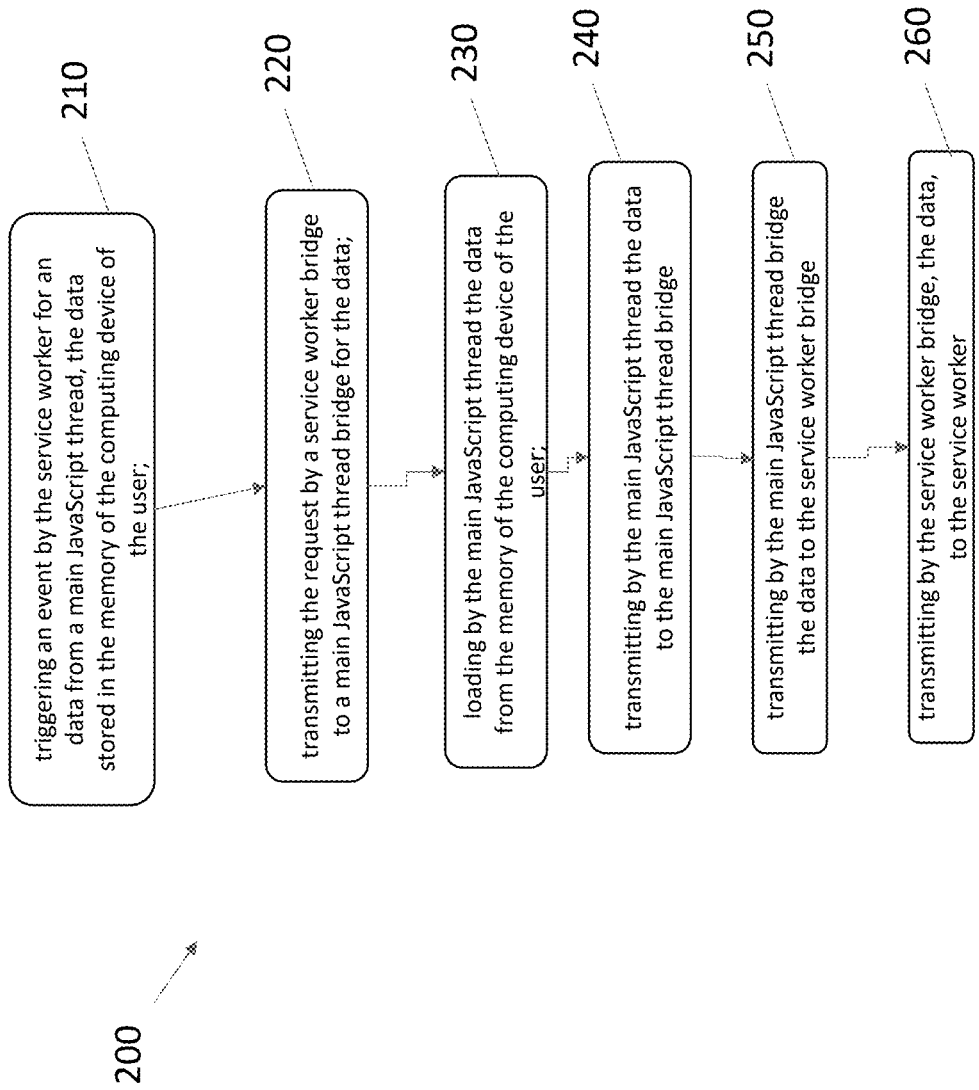
FIG. 2 is a flow chart of a method for a service worker to provide service with data stored in a memory of a computer, according to some embodiments of the invention.

FIG. 2 is a flow chart of a method 200 for a service worker to provide service with data stored in a memory of a computer, according to some embodiments of the invention.

The method can involve receiving by the service worker (e.g., service worker 115 as described above in FIG. 1) a request for data (e.g., access to an asset) from a main JavaScript thread, the data stored in the memory of the computing device of the user (e.g., the mobile device 110 as described above in FIG. 1) 210.

The method can involve transmitting the request by a service worker bridge (e.g., the service worker bridge 117 as described above in FIG. 1) to a main JavaScript thread bridge (e.g., the main JavaScript thread bridge 124 as described above in FIG. 1) for the data 220.

The method can also involve transmitting the request from the main JavaScript thread bridge to the main JavaScript thread for the data. The method can also involve loading by the main JavaScript thread the data from the memory of the computing device of the user (e.g., via the native device architecture 130 as described above in FIG. 1) 230. In some embodiments, the main JavaScript thread loads the data from the device filesystem, device settings, application configuration and/or device information.

The method can also involve transmitting by the main JavaScript thread the data to the main JavaScript thread bridge 240. The method can also involve transmitting by the main JavaScript thread bridge the data to the service worker bridge 250. The method can also involve transmitting by the service worker bridge, the data, to the service worker 260.

Figure 3:
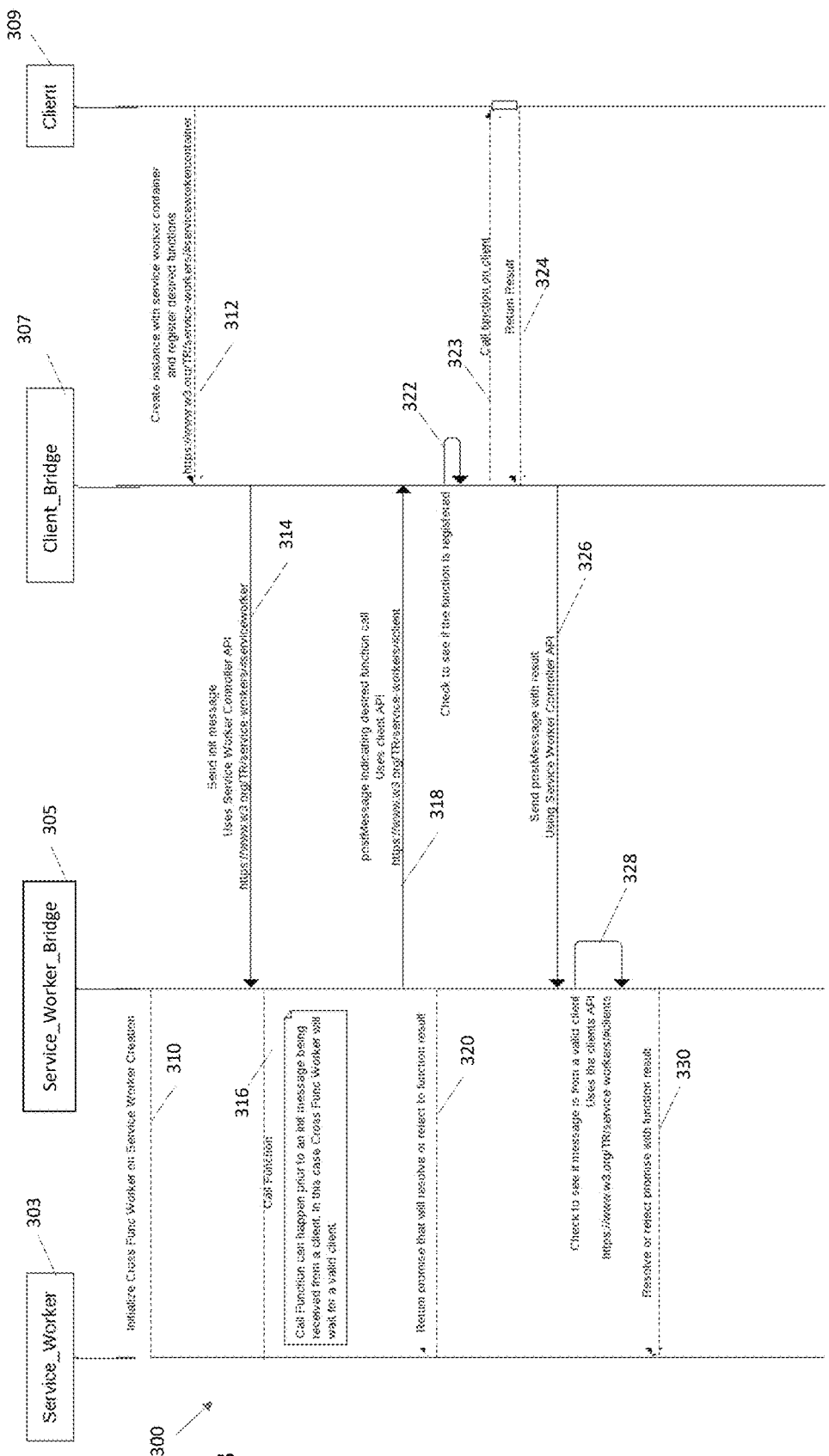
FIG. 3 is a sequence diagram illustrating an example of a service worker providing service with data stored in a memory of a computer, according to some embodiments of the invention.

FIG. 3 is a sequence diagram 300 illustrating an example of a service worker (e.g., service worker 117 as described above in FIG. 1) providing service with data (e.g., an asset) stored in a memory of a computer (e.g., the mobile device 110 as described above in FIG. 1), according to some embodiments of the invention.

Upon opening of an application on a computing device, the sequence diagram 300 can execute. The service worker 301 can initialize 310 a server worker bridge 303 (e.g., the service worker bridge 117 as described above in FIG. 1).

A first main JavaScript thread 309 (e.g., client) instantiates 312 a first main JavaScript thread bridge 307 (e.g., client bridge) and registers one or more functions with the first main JavaScript thread bridge 307. The service worker bridge 303 can be initialized 312 using a service worker and an array of tuples containing a function pointer along with a name.

The client bridge 307 can transmit an initialization message 314 to the server worker bridge 305 that indicates a new client has initiated. The contents of the initialization message 314 can be fixed. A unique identifier of an environment id can be added to metadata of the message.

The service_worker 303 can use a call function 316 function and pass a name of the desired function with an array of arguments to the service_worker_bridge 305.

The service_worker_bridge 305 can transmit a message 318 using a postMessage API that indicates a desired function call. For example, the message 318 transmitted using the postMessage API can include a desired function name, arguments to pass to the function, and/or a unique identifier that identifies the particular request to call the function. The client's API can be used to verify the client.

The servicer worker bridge 305 produce a promise 320 to be used by the service worker 303.

The client bridge 307 can determine if the function is registered 322. The determination can be made by checking a HashMap to determine if the function name given leads to a function pointer is has received in step 312.

The client bridge 307 can call a function 323 on the client 309. For example, the client bridge can use a function pointer as given in step 312 to call the function.

The client 309 can load data from local disc (e.g., native device architecture as described above in FIG. 1), and return results 324 to the client bridge 307. The return results 324 can include the data from the local disc. The return results 324 can be transmitted as a return value to a function being called.

The client bridge 307 can transmit a message 326 via the postMessage API with results (e.g., an identifier that identifies the specific function call, a Boolean representing success or failure of the function call and/or a result of the function call) 326 to the service_worker_bridge 305. The message 326 with results can be transmitted via the postMessage API function that can be located on the service worker object retrieved from a service worker controller API. The service_worker_bridge 305 can determine if the postMessage API 326 with results is from a valid client. The service_worker_bridge 305 can transmit a resolve or reject promise message 330 with function result.

In some embodiments, a first main JavaScript thread can be initiated and during execution a second main JavaScript thread can be initiated (e.g., a user switches functions during application operation). In some embodiments, the service worker and the service worker thread can prioritize the newest request for service such that the second main JavaScript thread has priority over the first main JavaScript thread.

Figure 4:
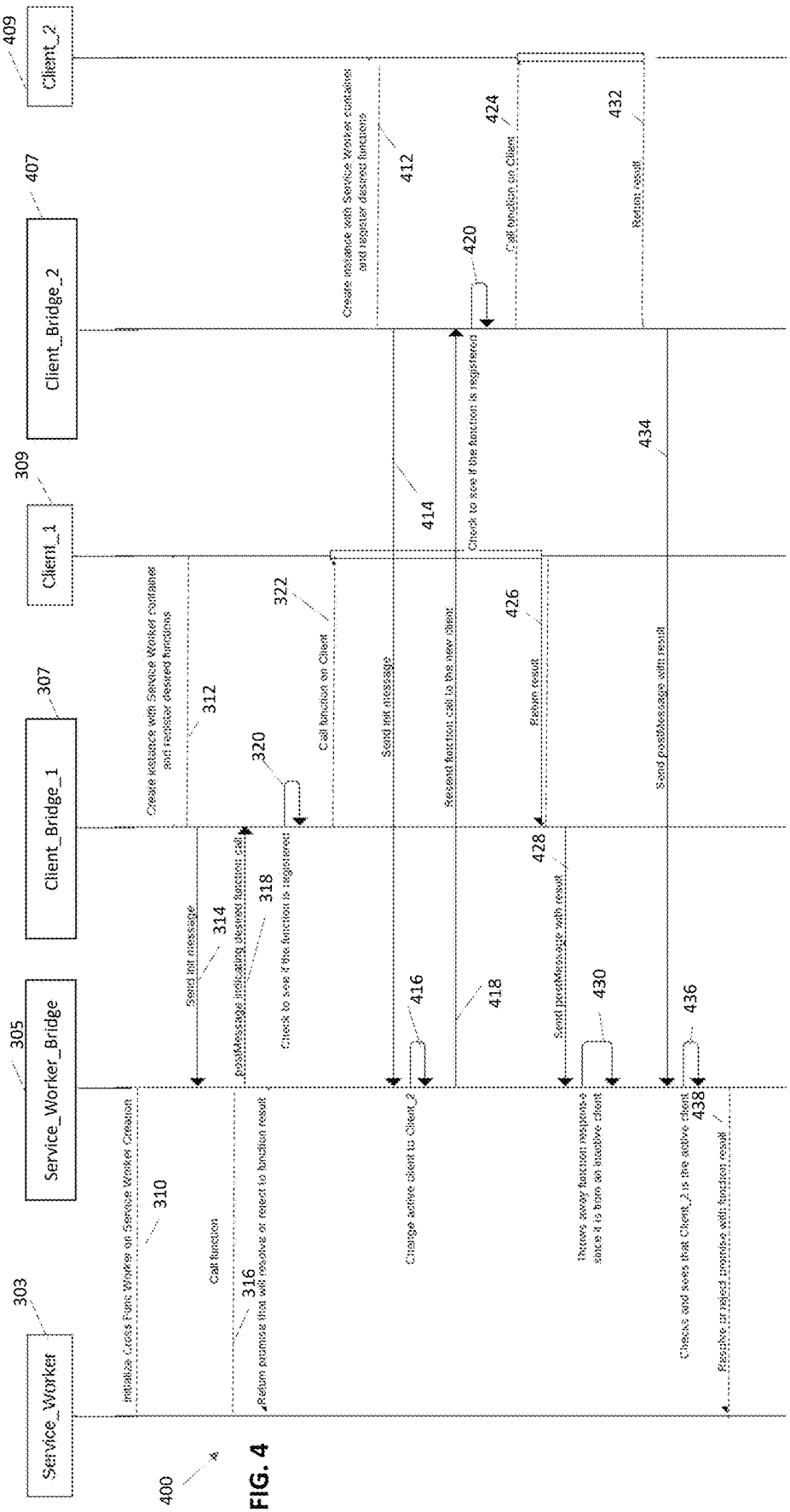
FIG. 4 is a sequence diagram illustrating an example of a service worker providing service with data stored in a memory of a computer, according to some embodiments of the invention.

FIG. 4 is a sequence diagram 400 illustrating an example of a service worker (e.g., service worker 117 as described above in FIG. 1) providing service with data (e.g., an asset) stored in a memory of a computer (e.g., the mobile device 110 as described above in FIG. 1), according to some embodiments of the invention. In particular, FIG. 4 illustrates an example of a sequence that can occur when a second main JavaScript thread 409 (e.g., client 2) is initiated by the application while a first main JavaScript thread (e.g., main JavaScript thread 309 as described above in FIG. 3) is in process.

For the purpose of simplicity, steps 310-322 and elements 303, 305, 307, and 309 are not redescribed herein when discussing FIG. 4. In FIG. 4, after step 322 is performed, the application receives a new request for data. For example, a user of the application navigates to a different part of the application that requires data other than the data that the service worker sought to retrieve from client 309. In this scenario, a second main JavaScript thread 309 (e.g., client_2) creates a second main JavaScript thread bridge 407 (e.g., client bridge 2) to communicate with the service_worker_bridge 305.

Client_2 409 instantiates 412 client bridge 2 407 and registers one or more functions with the client bridge 2 407.

The service worker bridge 303 can be initialized 312 using a service worker and an array of tuples containing a function pointer along with a name.

The second client bridge 407 can transmit an initialization message 414 to the server worker bridge 305 that indicates a new client has initiated. The contents of the initialization message 414 can include the postMessage API can create a unique identifier for the client and adds it to metadata of the message. The initialization message 414 can be transmitted according to the W3C standard API.

The service_worker_bridge 305 can change 416 the active client from client_1 309 to client 2 409.

The service worker 305 can resend functions by transmitting one or more previous messages 418 to the client bridge 2 407. The one or more previous messages that are reset can be the same messaging previously sent and/or a subset, e.g., messages that were in an incomplete state.

The client bridge 2 407 can determine if the function is registered 420. The determination can be made by checking a HashMap to determine if the function name given leads to a function pointer is has received in step 412.

The client bridge 2 407 can call a function 424 on the client 2 409. For example, the client bridge 2 407 can use a function pointer as given in step 312 to call the function.

The client 2 407 transmits a returned results message 426 that includes the data from its call function 424 to the client bridge 2 407, and the client bridge 2 407 can transmit a message 28 via the postMessage API with results to the service worker bridge 305. However, because the service worker bridge 305 set the active client to client 2 in step 416, the service worker bridge 307 can delete the results 430 from client 1.

The client_2 409 can load data from local disc (e.g., native device architecture as described above in FIG. 1) and return results 432 to the client bridge 2 407.

The return results 432 can include the data from the local disc.

The client bridge 2 407 can transmit a send postMessage API 434 with results to the service_worker_bridge 305. The postMessage API 434 with results can be transmitted via the service worker controller API. The service_worker_bridge 305 can determine if the postMessage API 434 with results is from client 2, the active client. The service_worker_bridge 305 can resolve or reject promise message 438 with function result.

The sequence diagram shown in FIG. 4 describes an interruption at a particular point along the sequence of client 309 as described in FIG. 3, namely step 322, however, client 2 can be initialized at any step along the sequence of FIG. 3, and the same subsequent steps can apply.

In some embodiments, a first main JavaScript thread can be initiated. Then a second main JavaScript thread can be subsequently initiated. The second main JavaScript thread can take a precedent over the first main JavaScript thread, such that the service worker services the second main JavaScript thread. The second main JavaScript thread can become disconnected, e.g., due to the user closing or changing. The service worker can determine that the first main JavaScript thread is still active and revive service to the first main JavaScript thread.

In some embodiments, the service worker can request data that is fully independent of a particular client that it is connected to. For example let assume A,B,C are clients of a service worker S. Let A be the active client and assume C makes a request for a local asset. Midway through the process of retrieving the asset, A disconnects. The disconnection of A is completely independent for the need of data at C. S then makes B the active client. B gets the local asset and returns it to S. Finally, S gives the asset to client C.

Figure 5:
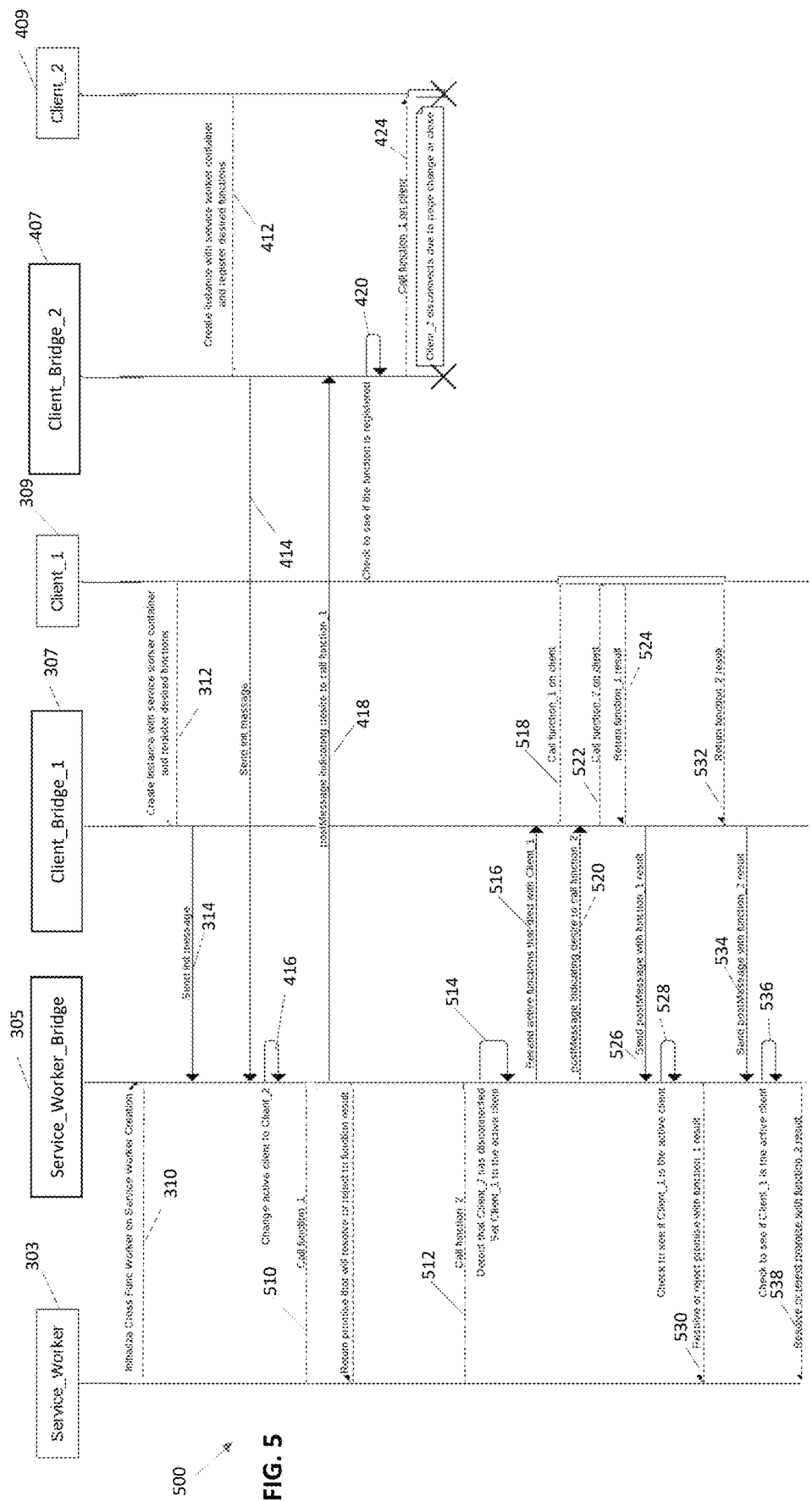
FIG. 5 is a sequence diagram illustrating an example of a service worker providing service with data stored in a memory of a computer, according to some embodiments of the invention.

FIG. 5 is a sequence diagram 500 illustrating an example of a service worker (e.g., service worker 117 as described above in FIG. 1) providing service with data (e.g., an asset) stored in a memory of a computer (e.g., the mobile device 110 as described above in FIG. 1), according to some embodiments of the invention. In particular, FIG. 5 illustrates an example of a sequence that can occur when a second main JavaScript thread 509 (e.g., client 2) is disconnected.

For the purpose of simplicity, steps 310-312, 412-420 and elements 303, 305, 307, 309, 407, and 409 are not redescribed herein when discussing FIG. 5. In FIG. 5, after the client bridge 2 407 call function 424 executed on the client 2 409, the client_2 409 is disconnected. For example, the client_2 409 can be disconnected due to a html page change or an html page closing.

The service worker 202 initiates a call function 2 512 with the service_worker_bridge 305. The service_worker_bridge 305 determines 514 that client_2 409 has disconnected and sets the active client to client_1 309. The service_worker_bridge 305 transmits a resend active functions that died with client 1 message 516 to the client bridge 1 307.

In some embodiments, the service_worker_bridge 305 detects that client_2 409 is disconnected based on performing a status check of each client on a predetermined interval.

The client bridge 1 307 calls a function 1 518 with client_1 309. In this manner, client_1 309 can handle the function that client_2 409 was set to perform.

The service worker bridge 305 also transmits a message 520 via the postMessage API indicating a desire to call function 2 to client_1 bridge 307. The client bridge 1 307 instantiates a call function 1 522 to client 1 309.

The client_1 309 returns function 1 results 524 to the client bridge 1 307. The client bridge 1 307 transmits a postMessage API message 526 with function 1 results to the service_worker_bridge 305. The service_worker_bridge 305 checks to determine if client 1 is the active client 528. The service_worker_bridge 305 resolves or rejects a promise with function 1 results 530 to the service_worker 303.

The client_1 309 returns function 2 results 532 to the client bridge 1 307. The client bridge 1 307 transmits a postMessage API message 534 with function 1 results to the service_worker_bridge 305. The service_worker_bridge 305 checks to determine if client 1 is the active client 536. The service_worker_bridge 305 resolves or rejects a promise with function 1 results 538 to the service_worker 303.

In some embodiments, if it is determined that client_2 409 is still active (e.g., by checking a client id is active by using the client's API) then instead of the service_worker_bridge 305 transmitting the functions of client_2 409 (e.g., the call function 1 510) to be executed with client_1 309, the service_worker_bridge 305 abandons functions of client 2 409.

Figure 6:
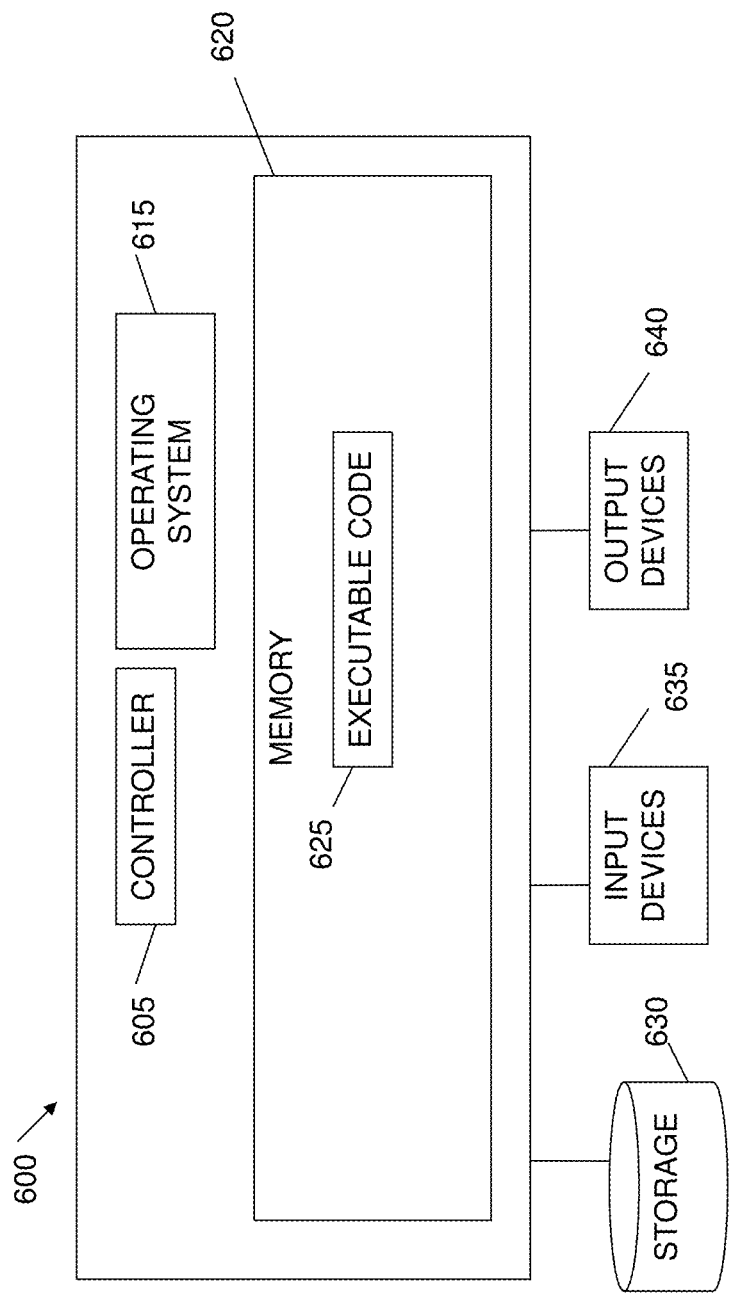
FIG. 6 is a block diagram of a computing device which can be used with embodiments of the invention.

FIG. 6 shows a block diagram of a computing device 600 which can be used with embodiments of the invention. Computing device 600 can include a controller or processor 605 that can be or include, for example, one or more central processing unit processor(s) (CPU), one or more Graphics Processing Unit(s) (GPU or GPGPU), a chip or any suitable computing or computational device, an operating system 615, a memory 620, a storage 630, input devices 635 and output devices 640.

Operating system 615 can be or can include any code segment designed and/or configured to perform tasks involving coordination, scheduling, arbitration, supervising, controlling or otherwise managing operation of computing device 600, for example, scheduling execution of programs. Memory 620 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 can be or can include a plurality of, possibly different memory units. Memory 620 can store for example, instructions to carry out a method (e.g. code 625), and/or data such as user responses, interruptions, etc.

Executable code 625 can be any executable code, e.g., an application, a program, a process, task or script. Executable code 625 can be executed by controller 405 possibly under control of operating system 615. For example, executable code 625 can when executed cause masking of personally identifiable information (PII), according to embodiments of the invention. In some embodiments, more than one computing device 600 or components of device 600 can be used for multiple functions described herein. For the various modules and functions described herein, one or more computing devices 600 or components of computing device 600 can be used. Devices that include components similar or different to those included in computing device 600 can be used, and can be connected to a network and used as a system. One or more processor(s) 605 can be configured to carry out embodiments of the invention by for example executing software or code. Storage 630 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 630 and can be loaded from storage 630 into a memory 620 where it can be processed by controller 605. In some embodiments, some of the components shown in FIG. 6 can be omitted.

Input devices 635 can be or can include for example a mouse, a keyboard, a touch screen or pad or any suitable input device. It will be recognized that any suitable number of input devices can be operatively connected to computing device 600 as shown by block 635. Output devices 640 can include one or more displays, speakers and/or any other suitable output devices. It will be recognized that any suitable number of output devices can be operatively connected to computing device 600 as shown by block 640. Any applicable input/output (I/O) devices can be connected to computing device 600, for example, a wired or wireless network interface card (NIC), a modem, printer or facsimile machine, a universal serial bus (USB) device or external hard drive can be included in input devices 635 and/or output devices 640.

Embodiments of the invention can include one or more article(s) (e.g. memory 620 or storage 630) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for a service worker to provide service with data stored in a memory of a computing device of a user, the method comprising:
    triggering, by the service worker, a first event for a first request for a first data from a first main JavaScript thread, wherein the first data from the first main JavaScript thread is stored in the memory of the computing device of the user;
    transmitting, by a service worker bridge, the first request for the first data to a first main JavaScript thread bridge for the first data stored in the memory of the computing device of the user;
    transmitting, by the first main JavaScript thread bridge, the first request for the first data to the first main JavaScript thread for the first data stored in the memory of the computing device of the user;
    loading, by the first main JavaScript thread, the first data stored in the memory of the computing device of the user;
    transmitting, by the first main JavaScript thread, the first data stored in the memory of the computing device of the user to the first main JavaScript thread bridge;
    transmitting, by the first main JavaScript thread bridge, the first data stored in the memory of the computing device of the user to the service worker bridge; and
    transmitting, by the service worker bridge, the first data stored in the memory of the computing device of the user to the service worker.

2. The method of claim 1 wherein the computing device of the user is a mobile device.

3. The method of claim 1 wherein the first data stored in the memory of the computing device of the user is a web page.

4. The method of claim 1 wherein the first main JavaScript thread is part of a mobile application.

5. The method of claim 1 further comprising:
    triggering, by the service worker, a second event for a second request for a second data from a second main JavaScript thread, wherein the second data from the second main JavaScript thread is stored in the memory of the computing device of the user;
    disconnecting the service worker bridge from the first main JavaScript thread bridge;
    transmitting, by the service worker bridge, the second request for the second data to the second main JavaScript thread bridge for the second data stored in the memory of the computing device of the user;
    transmitting, by the second main JavaScript thread bridge, the second request for the second data to the second main JavaScript thread for the second data stored in the memory of the computing device of the user;
    loading, by the second main JavaScript thread, the second data stored in the memory of the computing device of the user;
    transmitting, by the second main JavaScript thread, the second data stored in the memory of the computing device of the user to the second main JavaScript thread bridge;
    transmitting, by the second main JavaScript thread bridge, the second data stored in the memory of the computing device of the user to the service worker bridge; and
    transmitting, by the service worker bridge, the second data stored in the memory of the computing device of the user to the service worker.

6. The method of claim 5 further comprising:
    determining, by the service worker, that the second main JavaScript thread has disconnected;
    transmitting, by the service worker bridge, a third request for the first data to the first main JavaScript thread bridge for the first data stored in the memory of the computing device of the user;
    transmitting, by the service worker bridge, a fourth request for the second data to the first main JavaScript thread bridge for the second data stored in the memory of the computing device of the user;
    loading, by the first main JavaScript thread, the first data and the second data stored in the memory of the computing device of the user;
    transmitting, by the first main JavaScript thread, the first data stored in the memory of the computing device of the user to the first main JavaScript thread bridge;
    transmitting, by the first main JavaScript thread, the second data stored in the memory of the computing device of the user to the first main JavaScript thread bridge;
    transmitting, by the first main JavaScript thread bridge, the first data stored in the memory of the computing device of the user to the service worker bridge;
    transmitting, by the first main JavaScript thread bridge, the second data stored in the memory of the computing device of the user to the service worker bridge;
    transmitting, by the service worker bridge, the first data stored in the memory of the computing device of the user to the service worker based on an active state of the first main JavaScript thread; and
    transmitting, by the service worker bridge, the second data stored in the memory of the computing device of the user to the service worker based on an active state of the second main JavaScript thread.

7. The method of claim 6 wherein determining, by the service worker, that the second main JavaScript thread has disconnected further comprises periodically testing, by the service worker bridge, whether the second main JavaScript thread is connected.

8. The method of claim 1 wherein each new request for data is given priority by the service worker over a prior request for data.

9. A non-transitory computer readable medium storing a program comprising instructions which, when the instructions are executed, cause the program to:
  trigger, by the service worker, a first event for a first request for a first data from a first main JavaScript thread, wherein the first data from the first main JavaScript thread is stored in a memory of a computing device of a user;
  transmit, by a service worker bridge, the first request for the first data to a first main JavaScript thread bridge for the first data stored in the memory of the computing device of the user;
  transmit, by the first main JavaScript thread bridge, the first request for the first data to the first main JavaScript thread for the first data stored in the memory of the computing device of the user;
  load, by the first main JavaScript thread, the first data stored in the memory of the computing device of the user;
  transmit, by the first main JavaScript thread, the first data stored in the memory of the computing device of the user to the first main JavaScript thread bridge;
  transmit, by the first main JavaScript thread bridge, the first data stored in the memory of the computing device of the user to the service worker bridge; and
  transmit, by the service worker bridge, the first data stored in the memory of the computing device of the user to the service worker.

10. The non-transitory computer readable medium of claim 9 wherein the computing device of the user is a mobile device.

11. The non-transitory computer readable medium of claim 9 wherein the first data stored in the memory of the computing device of the user is a web page.

12. The non-transitory computer readable medium of claim 9 wherein the first main JavaScript thread is part of a mobile application.

13. The non-transitory computer readable medium of claim 9 wherein the instructions which, when the instructions are executed, further cause the program to:
  trigger, by the service worker, a second event for a second request for a second data from a second main JavaScript thread, wherein the second data from the second main JavaScript thread is stored in the memory of the computing device of the user;
  disconnect the service worker bridge from the first main JavaScript thread bridge;
  transmit, by the service worker bridge, the second request for the second data to the second main JavaScript thread bridge for the second data stored in the memory of the computing device of the user;
  transmit, by the second main JavaScript thread bridge, the second request for the second data to the second main JavaScript thread for the second data stored in the memory of the computing device of the user;
  load, by the second main JavaScript thread, the second data stored in the memory of the computing device of the user;
  transmit, by the second main JavaScript thread, the second data stored in the memory of the computing device of the user to the second main JavaScript thread bridge;
  transmit, by the second main JavaScript thread bridge, the second data stored in the memory of the computing device of the user to the service worker bridge; and
  transmit, by the service worker bridge, the second data stored in the memory of the computing device of the user to the service worker.

14. The non-transitory computer readable medium of claim 13 wherein the instructions which, when the instructions are executed, further cause the program to:
  determine, by the service worker, that the second main JavaScript thread has disconnected;
  transmit, by the service worker bridge, a third request for the first data to the first main JavaScript thread bridge for the first data stored in the memory of the computing device of the user;
  transmit, by the service worker bridge, a fourth request for the second data to the first main JavaScript thread bridge for the second data stored in the memory of the computing device of the user;
  load, by the first main JavaScript thread, the first data and the second data stored in the memory of the computing device of the user;
  transmit, by the first main JavaScript thread, the first data stored in the memory of the computing device of the user to the first main JavaScript thread bridge;
  transmit, by the first main JavaScript thread, the second data stored in the memory of the computing device of the user to the first main JavaScript thread bridge;
  transmit, by the first main JavaScript thread bridge, the first data stored in the memory of the computing device of the user to the service worker bridge;
  transmit, by the first main JavaScript thread bridge, the second data stored in the memory of the computing device of the user to the service worker bridge;
  transmit, by the service worker bridge, the first data stored in the memory of the computing device of the user to the service worker based on an active state of the first main JavaScript thread; and
  transmit, by the service worker bridge, the second data stored in the memory of the computing device of the user to the service worker based on an active state of the second main JavaScript thread.

15. The non-transitory computer readable medium of claim 14 wherein determining, by the service worker, that the second main JavaScript thread has disconnected further comprises periodically testing, by the service worker bridge, whether the second main JavaScript thread is connected.

16. The non-transitory computer readable medium of claim 9 wherein each new request for data is given priority by the service worker over a prior request for data.

* * * * *